(12) United States Patent
Teo

(10) Patent No.: US 7,789,571 B2
(45) Date of Patent: Sep. 7, 2010

(54) INTEGRATED OPTICAL INTERCONNECT

(75) Inventor: Tat Ming Teo, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/198,778

(22) Filed: Aug. 26, 2008

(65) Prior Publication Data

US 2009/0123118 A1    May 14, 2009

Related U.S. Application Data

(60) Provisional application No. 60/969,372, filed on Aug. 31, 2007.

(51) Int. Cl.
  *G02B 6/38* (2006.01)
  *G02B 6/36* (2006.01)
  *B29D 11/00* (2006.01)
(52) U.S. Cl. ............... 385/55; 385/53; 385/70; 385/74; 385/92; 385/93; 264/1.25
(58) Field of Classification Search ............. 385/53, 385/55, 70, 74, 92, 93; 264/1.25
See application file for complete search history.

(56) References Cited

U.S. PATENT DOCUMENTS

| 6,612,750 | B1 | 9/2003 | Bull et al. |
| 6,966,705 | B2 | 11/2005 | Sato et al. |
| 2005/0058410 | A1 | 3/2005 | Healy et al. |
| 2006/0045436 | A1* | 3/2006 | Wang et al. .......... 385/92 |

FOREIGN PATENT DOCUMENTS

JP    2007-183565    7/2007

\* cited by examiner

*Primary Examiner*—Mark A Robinson
*Assistant Examiner*—Michael P Mooney
(74) *Attorney, Agent, or Firm*—Workman Nydegger

(57) ABSTRACT

An integrated optical interconnect. The integrated optical interconnect includes a receptacle for connecting to a first external component. The receptacle includes an EMI shield with an aperture sized to allow transmission of an optical signal through the aperture while containing EMI within the receptacle. The integrated optical interconnect also includes a port injection molded around or within a portion of the receptacle, the port being configured to receive a second external component and a lens injection molded near a location of the aperture of the EMI shield.

20 Claims, 4 Drawing Sheets

INTEGRATED OPTICAL INTERCONNECT

CROSS-REFERENCE TO RELATED APPLICATIONS

This application claims the benefit of, and priority to, U.S. Provisional Patent Application Ser. No. 60/969,372 filed on Aug. 31, 2007, the contents of which are incorporated herein by reference in its entirety.

BACKGROUND

Typically a conventional fiber opto-electronic transceiver includes a receptacle, port, lens, and EMI shield components manufactured as separate components and later assembled together. Separate manufacture of each component raises the total cost of the final assembled interconnect. Moreover, as there are multiple components, each part adds to the cost associated with assembling the components together. Many assembled interconnects also need a high level of precision during the assembly. For example, the assembly of the port to the receptacle in an opto-electronic transceiver requires high precision alignment of these parts and must provide high tolerance for any external components to be connected. Additional costs are associated with such high precision alignment and assembly of the various components. If the alignment of components is not precisely controlled, such misalignment results in power or sensitivity loss in the assembled interconnect, or difficulty in connecting the assembled interconnect to a fiber optical cable connector or other component during use.

In addition to the costs associated with precise alignment during assembly, additional error may be introduced in such conventional designs due to electromagnetic interference (EMI). In such assembled interconnects, the unprotected area of a plastic port should be provided with a shielding mechanism to prevent transmission of stray electromagnetic energy. In addition, where the port is round, but the aperture of the receptacle is rectangular, there is a mechanical challenge to close the gaps between the port and the receptacle while maintaining proper alignment of the port and receptacle. Other features which have been used to provide EMI shielding include cushions, gaskets, and absorbers placed in a location to block the transmission of EMI through the port. These conventional EMI shielding components have not been entirely successful at preventing EMI leakage, however, and further add to the costs associated with alignment and assembly.

Finally, if a separate ball/aspherical lens cap is used in the interconnect, a lack of concentricity between the lens and an optical device of the optical subassembly, such as a laser or optical receiver, will cause light to be diverted at an angle. As a result, the light transferred through the lens will be likewise offset and may not sufficiently couple to the optical receiver, to an optical fiber, or to whatever component is being connected. Thus, the conventional assembly processes and components result in additional costs associated with the high precision assembly, problems associated with effective EMI shielding, and potentially compromised optical coupling performance.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An embodiment of the invention includes an integrated optical interconnect. The integrated optical interconnect includes a receptacle for connecting to a first external component. The receptacle includes an EMI shield with an aperture sized to allow transmission of an optical signal through the aperture while containing EMI within the receptacle. The integrated optical interconnect also includes a port injection molded around or within a portion of the receptacle, the port being configured to receive a second external component and a lens injection molded near a location of the aperture of the EMI shield.

Another embodiment of the invention includes the method of manufacturing an integrated optical interconnect. The method comprises providing a receptacle having an open end for receiving a first external component. The receptacle includes an EMI shield with an aperture sized to allow transmission of an optical signal through the aperture while containing EMI within the receptacle. The method also includes molding a port around or within at least a portion of the receptacle, the port being configured to receive a second external component and molding a lens near a location of the aperture of the EMI shield.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

According to the embodiments disclosed herein, at least two components of an interconnect assembly are manufactured in an integrated single piece. Thus, the components may be integrated into the interconnect during manufacture of the components. For example, in some embodiments, a first piece of an integrated optical interconnect is injection molded about, or within, a second piece of the integrated optical interconnect. In other embodiments, the receptacle, port, lens, and EMI shield are manufactured as a single integrated optical interconnect where subsequent assembly of the individual parts may be eliminated. In some embodiments, the interconnect is manufactured from metal and includes a feature for EMI shielding. Subsequently, the port and lens may be injection molded to the interconnect and EMI shielding feature such that the resulting integrated optical interconnect including the receptacle, port, and lens components, has a high tolerance alignment without the need for subsequent assembly as well as the other costs discussed above.

Figure 1:
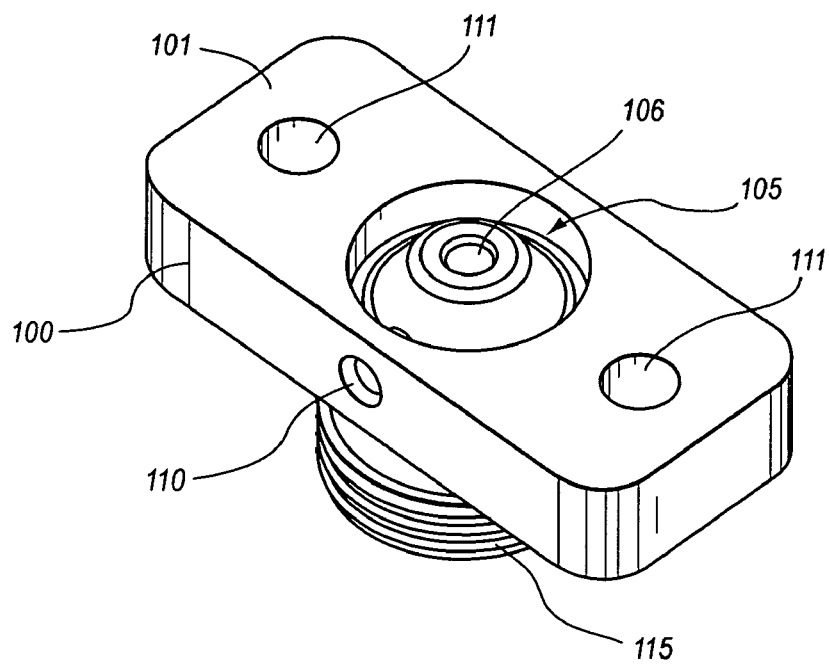
FIG. 1 illustrates an example of an integrated optical interconnect before injection molding.

FIG. 1 illustrates an example of an integrated optical interconnect 100 in which a receptacle 101 and EMI shield 105 are manufactured as a single unit. FIG. 1 also includes a gate 110 for injection molding, a connector 115 and features 111 for securing an external component which will be discussed in further detail below. The integrated optical interconnect 100 of FIG. 1 is made of metal but can be made of any other material suitable for EMI shielding such as Faradax, conductive elastomers, conductive coatings, conductive adhesives, conductive thermoplastics, or any other material which is effective in preventing EMI leakage through the shield. The integrated optical interconnect 100 may be zinc cast and Cu—Ni plated, for example. The receptacle 101 and EMI shield 105 can be made of the same material or be made of different materials depending on the properties desired and the manufacturing process used. For example, the receptacle 101 can be made of metal while the EMI shield 105 is made of conductive thermoplastic.

The receptacle 101 can be shaped to allow connection to the proper device. For example, the receptacle 101 of FIG. 1 is configured to mate with a bulkhead panel mount configuration containing one or more optical subassemblies. However, external components can include optical fiber, an optoelectronic component, such as a laser or an optical detector, an optical subassembly, or any other device for the transmission or reception of optical or electromagnetic signals. The shape and configuration of the receptacle 101 can be changed according to the uses for which the integrated optical interconnect 100 is intended. For example, the receptacle 101 can be configured for a dual optical interconnect with both receptacles formed as a single piece in a side-by-side configuration. In another example, the receptacle 101 can be formed within a transceiver module, either within the housing or in some other manner, to allow connection of optical fibers to the transceiver.

The EMI shield 105 is designed to block electromagnetic radiation from escaping the internal cavity of the integrated optical interconnect 100. Additionally, the EMI shield 105 contains an aperture 106 which allows for the transmission of an optical signal between external components. Thus, the desired optical signals are transmitted through the aperture 106 and the unwanted EMI is blocked by the EMI shield 105.

Figure 2:
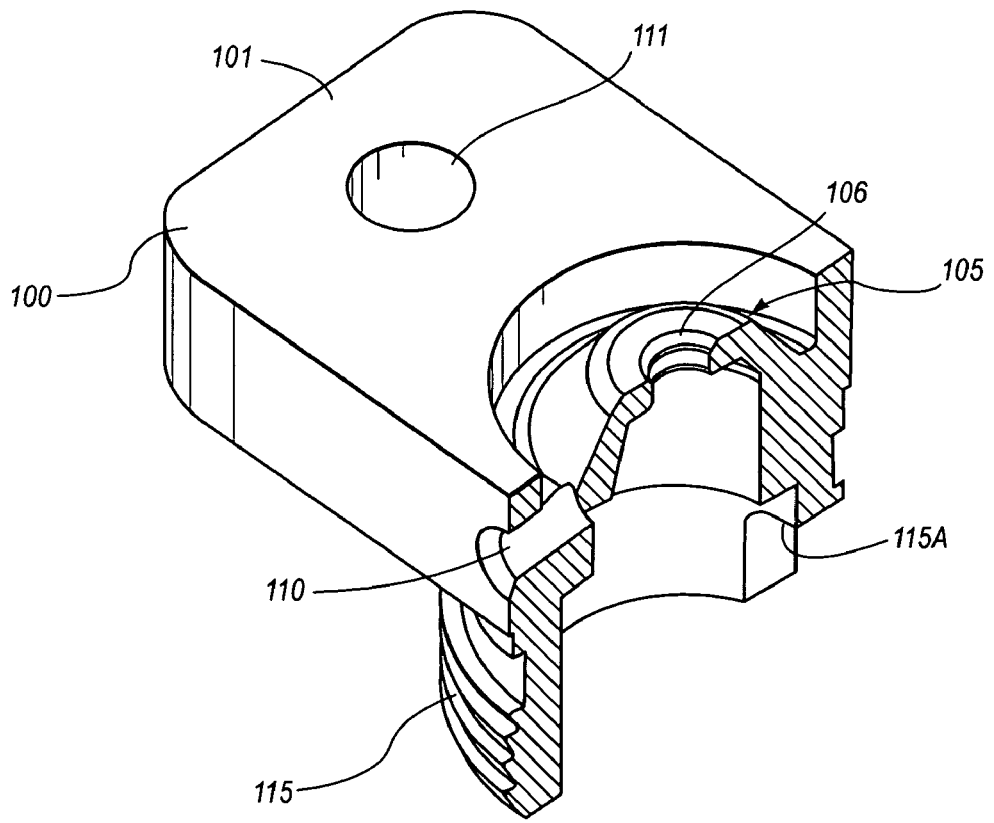
FIG. 2 illustrates a cross-sectional representation of the example of an integrated optical interconnect of FIG. 1.

FIG. 2 illustrates a cross-sectional representation of the integrated optical interconnect 100 of FIG. 1, which includes the gate 110 for injection molding a plastic port and/or a lens into the integrated optical interconnect 100. Injection molding is a manufacturing technique for making parts from plastics or other suitable polymers in production. Molten plastic is injected at high pressure into a mold, which is the inverse of the product's shape. When the plastic or other suitable polymer has cooled sufficiently the mold is removed. During an injection-molding process on the integrated optical interconnect 100, the integrated optical interconnect 100 is placed in an injection mold. A polymer, such as plastic, is injected into the gate 110 thereby filling some or all of the voids of the mold. The polymer can be selected to allow or to prevent transmission of specific wavelengths.

Additionally, a connector can be provided on the port side of the integrated optical interconnect 100 for connection to additional components. For example, the connector 115 is threaded to allow the component to be screwed on and secured to the integrated optical interconnect 100. However, this connector 115 can be changed according to the uses for which the integrated optical interconnect 100 is intended or according to the external components to be connected.

Precise alignment can be ensured by other features designed to ensure connection of the external component in a precise manner. For example, the connector 115 has a notch 115A which ensures that the external component may be connected with only a particular alignment. Additional features such as additional notches, groves, or ridges which allow for connection between the external component and integrated optical interconnect 100 in only a particular manner or only with a particular alignment can be provided, according to the external component being connected.

Figure 3:
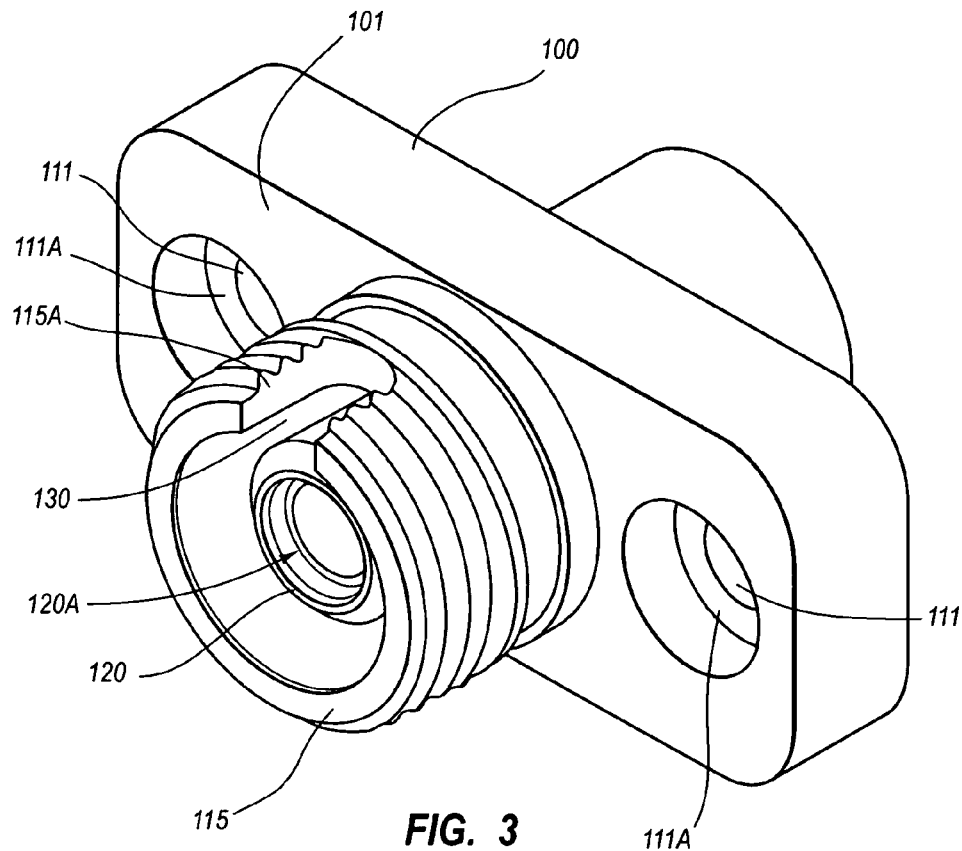
FIG. 3 illustrates an example of an integrated optical interconnect after injection molding.

FIG. 3 illustrates an example of an integrated optical interconnect 100 in which the injection molding is complete. A port 120 with a precision controlled ferule inner diameter 120A has been molded. This allows for precise alignment between an optical fiber, or other external component, connected on the port side of the integrated optical interconnect 100 and the injection molded lens or external component connected on the receptacle side of the integrated optical interconnect 100. Injection molding of the port 120 creates a precise alignment between the port 120 and the receptacle 101. Without injection molding, precision plugs would have to be inserted during each step of the assembly process to ensure accuracy before further assembly took place, increasing the cost and manufacture time of the interconnect.

Additionally, other features may be molded within the integrated optical interconnect 100. For example, in the example integrated optical interconnect 100 of FIG. 3, the cavity on the port side of the integrated optical interconnect 100 has not been completely filled with the injection material. An additional cavity 130 has been molded to allow for proper mating with the external component to be connected. This cavity 130 or other features can be present or absent depending on the type of connector being used.

Figure 4:
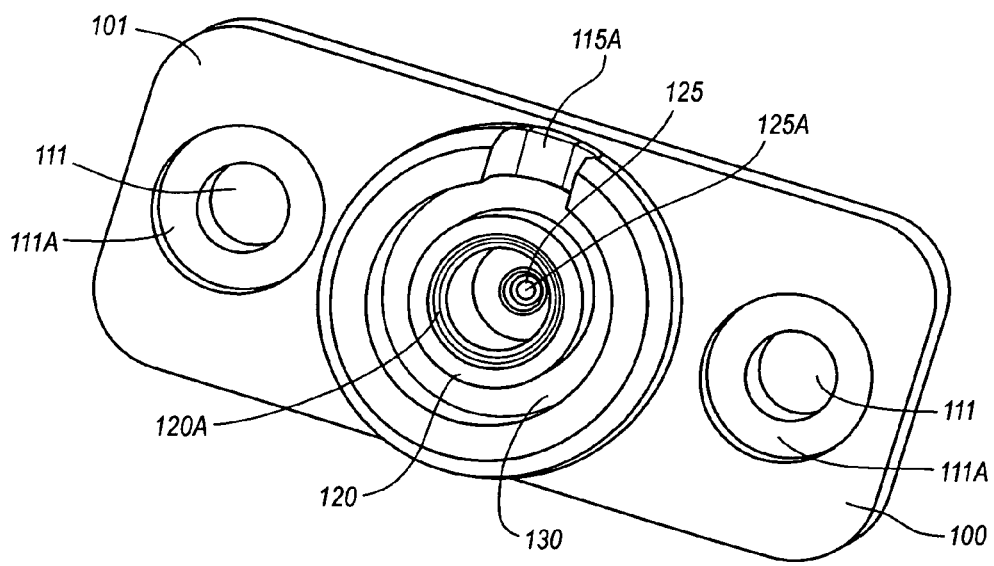
FIG. 4 illustrates a view into the molded port of the integrated optical interconnect FIG. 3.

FIG. 4 illustrates the injection molded integrated optical interconnect 100 of FIG. 3 with a view into the molded port 120. A lens 125, including first lens surface 125A, can be injection molded in the port 120 near the aperture of the EMI shield. Additionally, the shape of the lens 125 can be configured to allow or to prevent transmission of specific wavelengths. Injection molding of the lens eliminates the need to use a precision can welder to align the lens. Injection molding lowers the cost and decreases manufacturing time when compared to precision can welding, while simultaneously providing greater alignment accuracy of the lens.

The receptacle 101 can include features 111 for connecting to an external component. Features 111 can include holes for screws or bolts, threading, clips, or any other feature useful for securing the receptacle to an external component. The feature can include additional sub-features to improve the connection, such as ledges 111A, or any other sub-feature which would improve or otherwise enhance the connection to the external component.

Figure 5:
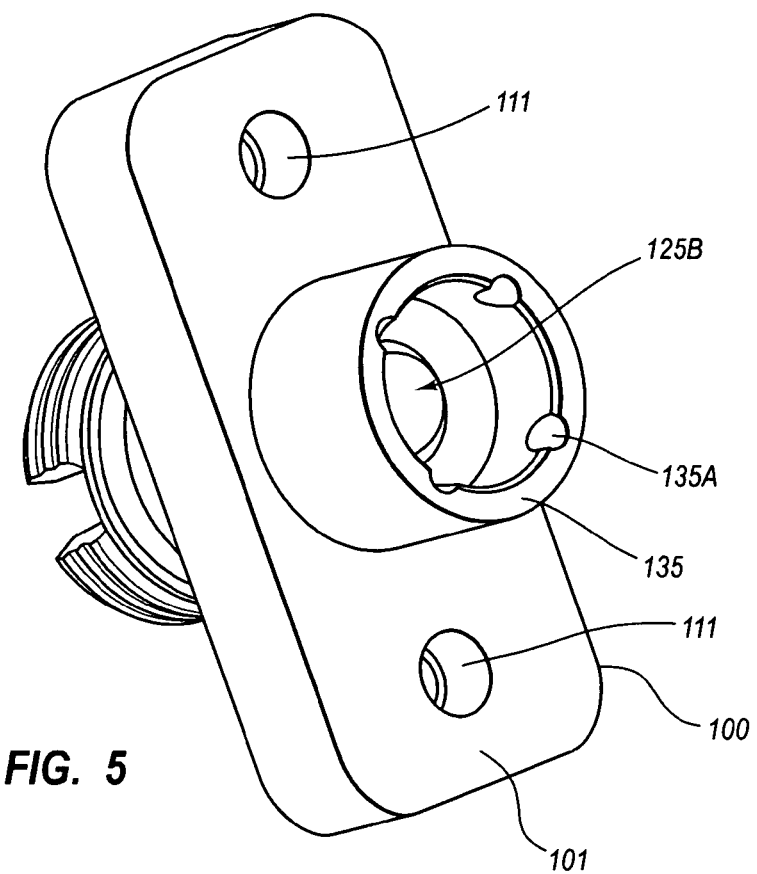
FIG. 5 illustrates a view of the receptacle side of the integrated optical interconnect of FIG. 3.

FIG. 5 illustrates the injection molded integrated optical interconnect 100 of FIGS. 3 and 4 with a view of the receptacle side of the integrated optical interconnect 100. The lens 125 of FIG. 4 has a second surface 125B. Additionally, a second port 135 can be molded to provide additional precision in the alignment with the panel mount bulkhead, or other external component, to be connected on the receptacle side of the integrated optical interconnect 100. The second port 135 of FIG. 5 has notches 135A to ensure precise alignment of the external component to be connected on the receptacle side of the integrated optical interconnect 100. However, the second port may be of any shape or include any features necessary to ensure the proper connection and alignment with the external component.

Figure 6:
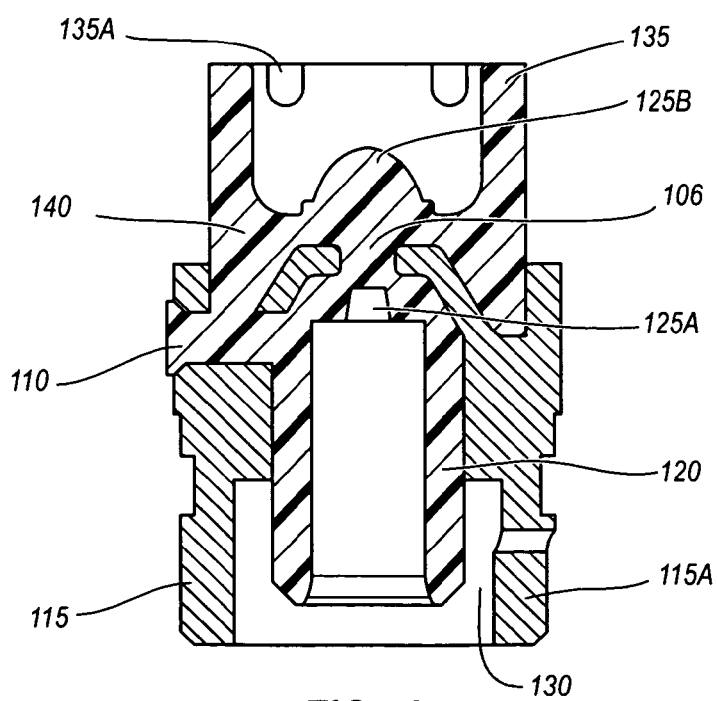
FIG. 6 illustrates a cross-sectional view of an example integrated optical interconnect.

FIG. 6 illustrates a cross-sectional view of an example of a complete injection molded integrated optical interconnect 100. A polymer 140, such as plastic, has been injected through a gate 110. The polymer 140 can be molded to provide a precision controlled port 120 for the reception of an external component. A second port 135 can be provided for connection to additional external components. Other features may be included in either the receptacle or the injection molded material to improve the alignment of the components. A lens 125A and 125B may also be molded to improve or enhance the transmission of the optical signal or to prevent transmission of unwanted or undesirable wavelengths.

Figure 7:
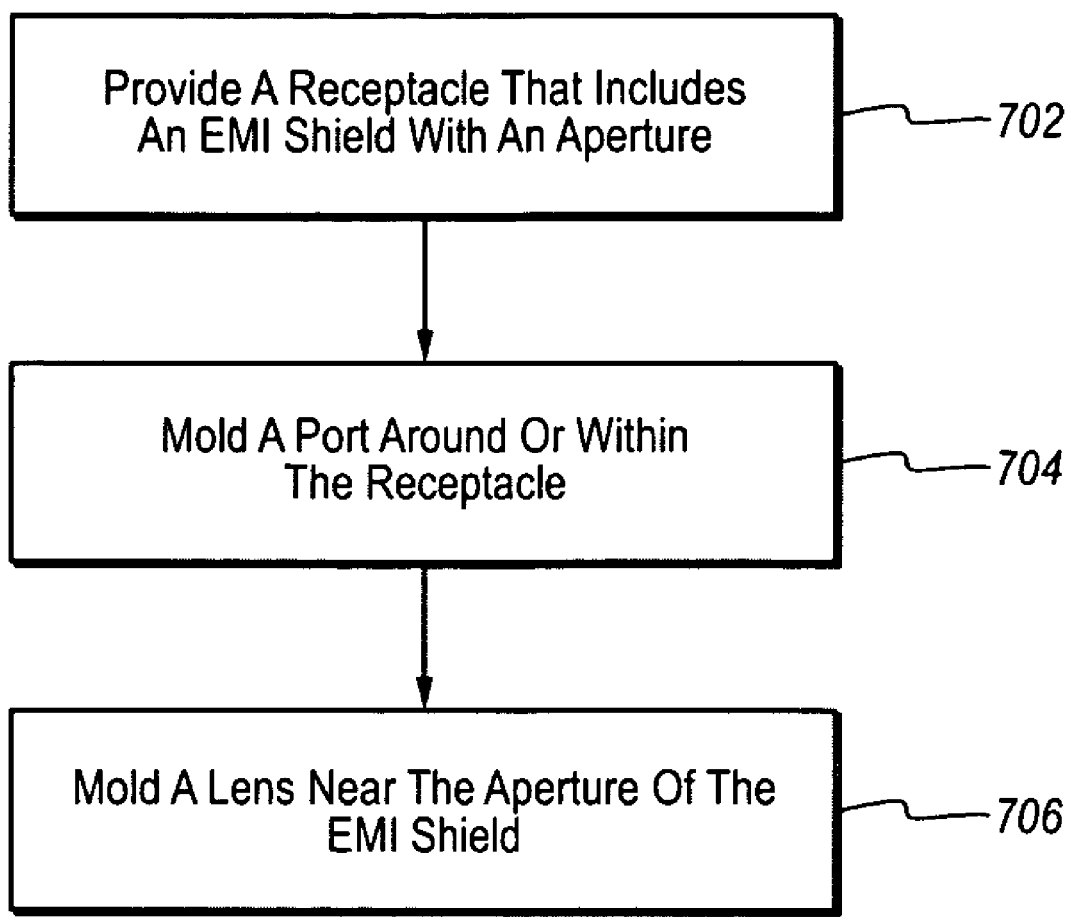
FIG. 7 is a flow diagram illustrating a method for manufacturing an integrated optical interconnect.

FIG. 7 illustrates an example of a method 700 for manufacturing an integrated optical interconnect. The method may be used to manufacture the integrated optical interconnect 100 of FIGS. 1-6, therefore, the method will be explained in relation to the integrated optical interconnect 100 of FIGS. 1-6. Note, however, that the integrated optical interconnect 100 of FIGS. 1-6 is only one of many integrated optical interconnects that may implement the method.

The method 700 includes providing 702 a receptacle, for example receptacle 101. The shape and configuration of the receptacle 101 can be changed according to the external component to be connected to the integrated optical interconnect 100. External components can include bulkhead panel mount assemblies, optical fiber, an opto-electronic component, such as a laser or an optical detector, an optical subassembly, or any other device for the transmission or reception of optical or electromagnetic signals. For example, the receptacle 101 can be configured for a dual optical interconnect with both receptacles formed as a single piece in a side-by-side configuration. In another example, the receptacle 101 can be formed within a transceiver module, either within the housing or in some other manner, to allow connection of optical fibers to the transceiver.

The receptacle 101 can include an EMI shield, such as EMI shield 105, with an aperture, such as aperture 106, sized to allow the transmission of an optical signal. The EMI shield 105 can be made of any material suitable for EMI shielding such as Faradax, conductive elastomers, conductive coatings, conductive adhesives, conductive thermoplastics, or any other material which is effective in preventing EMI leakage through the shield.

The method 700 also includes molding 704 a port around or within the receptacle. The port can be configured to receive an external component. Molding 704 of the port 120 can be accomplished through injection molding or through any other molding process which allows for the creation of the desired characteristics of the port 120. For example, a polymer 140, such as plastic, can be injected through a gate 110 to mold the port 120. In an example, a port 120 with a precision controlled ferule inner diameter 120A can be molded. This allows for precise alignment between an optical fiber, or other external component, connected on the port side of the integrated optical interconnect 100 and the lens 125 or external component connected on the receptacle side of the integrated optical interconnect 100.

The method 700 further includes molding 706 a lens near the aperture of the EMI shield to allow transmission of an optical signal. For example, a lens 125, including first lens surface 125A and second lens surface 125B, can be injection molded near the aperture 106 of EMI shield 105. A polymer 140, such as plastic, can be injected into the receptacle to form the lens 125. The polymer may be configured to allow or to prevent transmission of specific wavelengths. Additionally, the shape of the first surface 125A and the second surface 125B may be configured to improve or enhance the transmission of the optical signal or to prevent transmission of unwanted or undesirable wavelengths.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated optical interconnect, comprising:
    a receptacle for connecting to a first external component;
    an EMI shield integrated with the receptacle and including an aperture sized to allow transmission of an optical signal through the aperture while containing EMI within the receptacle;
    a port injection molded around or within a portion of the receptacle, the port being configured to receive a second external component; and
    a lens injection molded near a location of the aperture of the EMI shield, wherein the receptacle includes a gate designed to allow injection molding of the port and lens.

2. An integrated optical interconnect according to claim 1, wherein the first external component includes an optical fiber.

3. An integrated optical interconnect according to claim 1, wherein the second external component includes an optical fiber.

4. An integrated optical interconnect according to claim 1, wherein the port has a precision controlled ferrule inner diameter.

5. An integrated optical interconnect according to claim 1, wherein the port and lens include a polymer.

6. An integrated optical interconnect according to claim 5, wherein the polymer includes plastic.

7. An integrated optical interconnect according to claim 6, wherein the plastic is configured to transmit specific wavelengths.

8. An integrated optical interconnect according to claim 1, wherein the shape of the lens is configured to transmit specific wavelengths.

9. An integrated optical interconnect according to claim 4, wherein the receptacle includes metal.

10. An integrated dual optical interconnect comprising two optical interconnects according to claim 1, wherein both receptacles are formed as a single piece in a side-by-side configuration.

11. A transceiver module comprising the integrated optical interconnect according to claim 1.

12. A transceiver module according to claim 11, wherein the receptacle of the integrated optical interconnect is integrated with a housing of the transceiver module.

13. A bulkhead panel mount comprising one or more integrated optical interconnects according to claim 1.

14. A method for manufacturing an integrated optical interconnect, comprising: providing a receptacle having an open end for receiving a first external component, the receptacle including an EMI shield including an aperture sized to allow transmission of an optical signal through the aperture while containing EMI within the receptacle; molding a port around or within at least a portion of the receptacle, the port being configured to receive a second external component; molding a lens near a location of the aperture of the EMI shield; and providing a gate in the receptacle for injecting a polymer into the receptacle to mold the port and/or the lens.

15. A method for manufacturing an integrated optical interconnect according to claim 14, further comprising injecting a polymer into the gate to mold the port and/or the lens.

16. A method for manufacturing an integrated optical interconnect according to claim 15, further comprising placing the receptacle in a mold prior to injecting a polymer into the gate to mold the optical port and/or the lens.

17. A method for manufacturing a dual integrated optical interconnect comprising manufacturing two optical interconnects according to claim 14, wherein the two receptacles are integrated into a single piece into which the port and/or lens are molded.

18. A method for manufacturing a bulk head panel mount integrated optical interconnect comprising manufacturing one or more optical interconnects according to claim 14, wherein the one or more receptacles are integrated into a single piece into which the ports and/or lens are molded.

19. A method for manufacturing a bulk head panel mount integrated optical interconnect according to claim 18, wherein the ports and/or lenses are molded in a single injection molding.

20. A method for manufacturing a bulk head panel mount integrated optical interconnect comprising manufacturing one or more optical interconnects according to claim 14, wherein the one or more receptacles comprise individual metallic parts into which the port and/or lens are molded.

* * * * *